(12) United States Patent
Filgueiras

(10) Patent No.: US 7,497,753 B1
(45) Date of Patent: Mar. 3, 2009

(54) SAFETY SEAT

(76) Inventor: Ivania Filgueiras, 269 Giralda Ave., Suite 303, Coral Gables, FL (US) 33134

( * ) Notice: Subject to any disclaimer, the term of this patent is extended or adjusted under 35 U.S.C. 154(b) by 0 days.

(21) Appl. No.: 12/138,570

(22) Filed: Jun. 13, 2008

Related U.S. Application Data

(63) Continuation-in-part of application No. 11/867,468, filed on Oct. 4, 2007, now abandoned.

(51) Int. Cl.
*A47D 15/00* (2006.01)
(52) U.S. Cl. .................................. 441/130; 297/184.13
(58) Field of Classification Search . 297/250.1–256.17, 297/136, 183.1–183.3, 184.13, 219.12, 216.11; 441/129–132, 136, 80, 88, 87, 133, 134
See application file for complete search history.

(56) References Cited

U.S. PATENT DOCUMENTS

| 4,502,157 | A | 3/1985 | Wong | 2/202 |
| 5,409,411 | A * | 4/1995 | Schrieber | 441/80 |
| 6,056,355 | A * | 5/2000 | Klassen | 297/184.13 |
| 7,083,228 | B1 * | 8/2006 | Al Sawan | 297/184.13 |
| 2006/0087161 | A1 | 4/2006 | Filgueiras | 297/184.13 |

* cited by examiner

*Primary Examiner*—Ed Swinehart
(74) *Attorney, Agent, or Firm*—Sanchelima & Assoc., P.A.

(57) ABSTRACT

A safety seat with air enclosure mechanism for infants that permits its retrieval from a body of water with a significant amount of air to extend the breathing time of the enclosed child and prevent drowning. The seat includes a compartment for a flexible enclosure that can be readily deployed to temporarily enclose the seat assembly and infant completely for their easy retrieval from dangerous conditions. A spring loaded roller or winding mechanism keeps one end attached while the other end is open and stretchable to cover the infant and the seat assembly. The spring loaded winding mechanism keeps the enclosure tense to facilitate its deployment by a user.

7 Claims, 5 Drawing Sheets

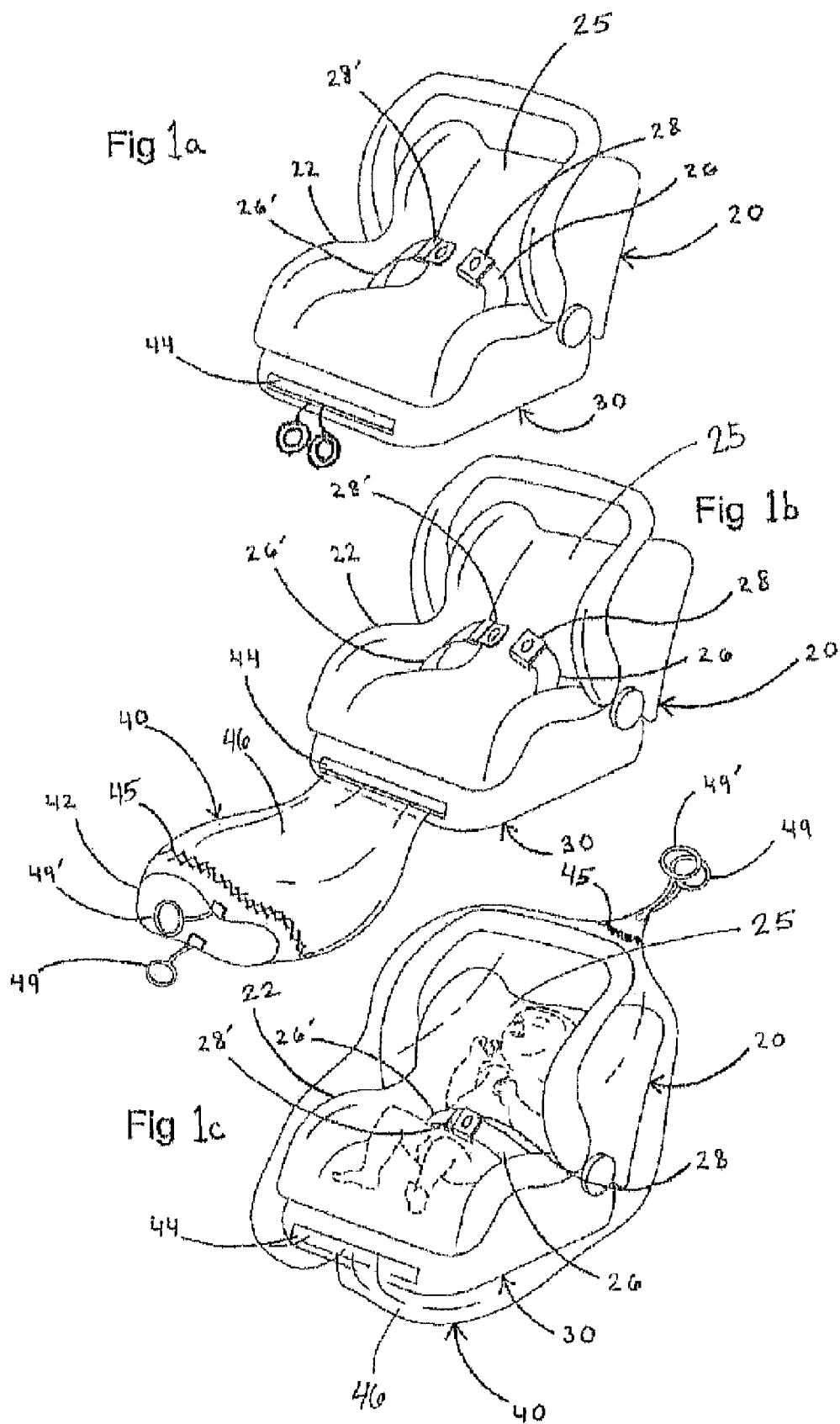

SAFETY SEAT

OTHER RELATED APPLICATIONS

The present application is a continuation-in-part of U.S. patent application Ser. No. 11/867,468 for Safety Seat, filed on Oct. 4, 2007 now abandoned, which is hereby incorporated by reference.

BACKGROUND OF THE INVENTION

1. Field of the Invention

The present invention relates to a safety seat, and more particularly, to a safety seat with a releasable air trapping enclosure that permits an infant user to breathe for a few minutes.

2. Description of the Related Art

Several designs for a safety seat have been designed in the past. None of them, however, includes an enclosure that can be readily released to cover a child to entrap within the enclosure a sufficient amount of air. This permits a child to inhale air several times before the air becomes vitiated and delays the entry of water in his/her lungs while attempting retrieval from a body of water.

Applicant believes that the closest reference corresponds to U.S. patent publication No. 2006/0087161 (Filgueiras) of Apr. 27, 2006. However, it differs from the present invention because even though a safety bag system is disclosed, it lacks the winding mechanism that permits a user to pull the bag maintaining sufficient tension to permit the user to enclose the child. One end of the bag is kept tied to the winding mechanism. The positioning of the stretchable member 45 in the present invention also obviates several problems and saves precious seconds in the deployment of the device. Prior to the present invention, the applicant had problems with the deployment of the bag. Also, after the child is removed from the body of water, the present invention retracts the bag inside, helping the user to liberate the child from possible suffocation.

One of the related prior art references is U.S. Pat. No. 4,502,157 for a protective enclosure having self-contained air supply. However, the enclosure is not water tight nor designed to entrap a significant amount of air to temporarily extend the breathing time of a user in a body of water. Much less does it suggest its use in conjunction with an infant seat to permit the enclosure of the seat assembly and the infant for their ready retrieval from a dangerous condition while giving the infant precious extra minutes to breathe.

Other references describing the closest subject matter provide for a number of more or less complicated features that fail to solve the problem in an efficient and economical way. None of these references suggest the novel features of the present invention.

SUMMARY OF THE INVENTION

It is one of the main objects of the present invention to provide a safety seat for infants that includes an air entrapment enclosure that can be readily deployed and retracted when no longer needed.

It is still another object of the present invention to provide a safety seat that is compatible with conventional vehicles.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1a represents an isometric view of a safety seat for an infant incorporating an embodiment of the present invention before being deployed.

FIG. 1b illustrates an isometric view of a safety seat of the present invention showing flexible enclosure 40 being retrieved from compartment assembly 30.

FIG. 1c shows the seat of the previous figure enclosed by flexible enclosure 40.

DETAILED DESCRIPTION OF THE PREFERRED EMBODIMENT

Figure 1:
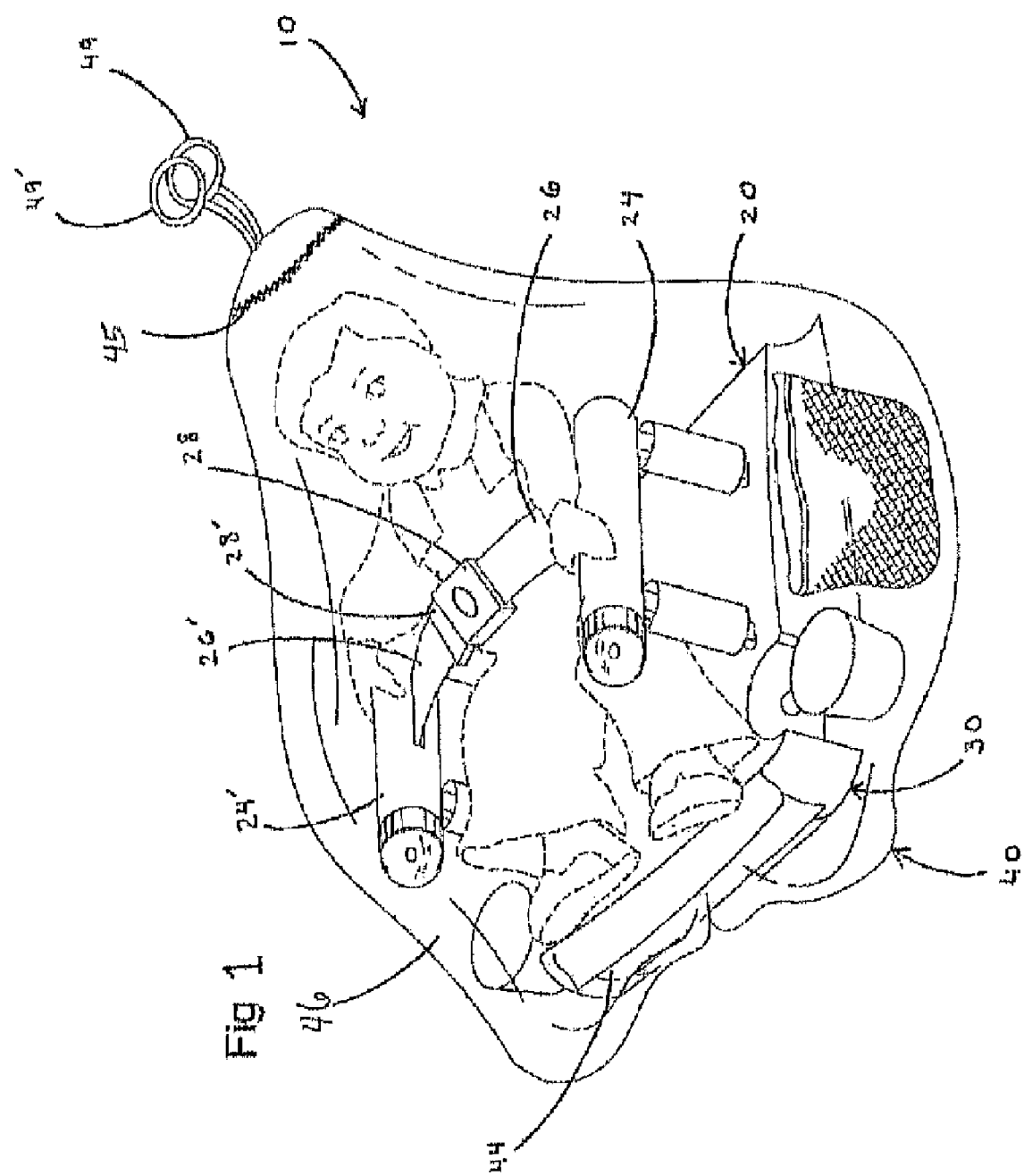
FIG. 1 shows an isometric view of a safety seat showing a child enclosed by a deployed bag.
Figure 2:
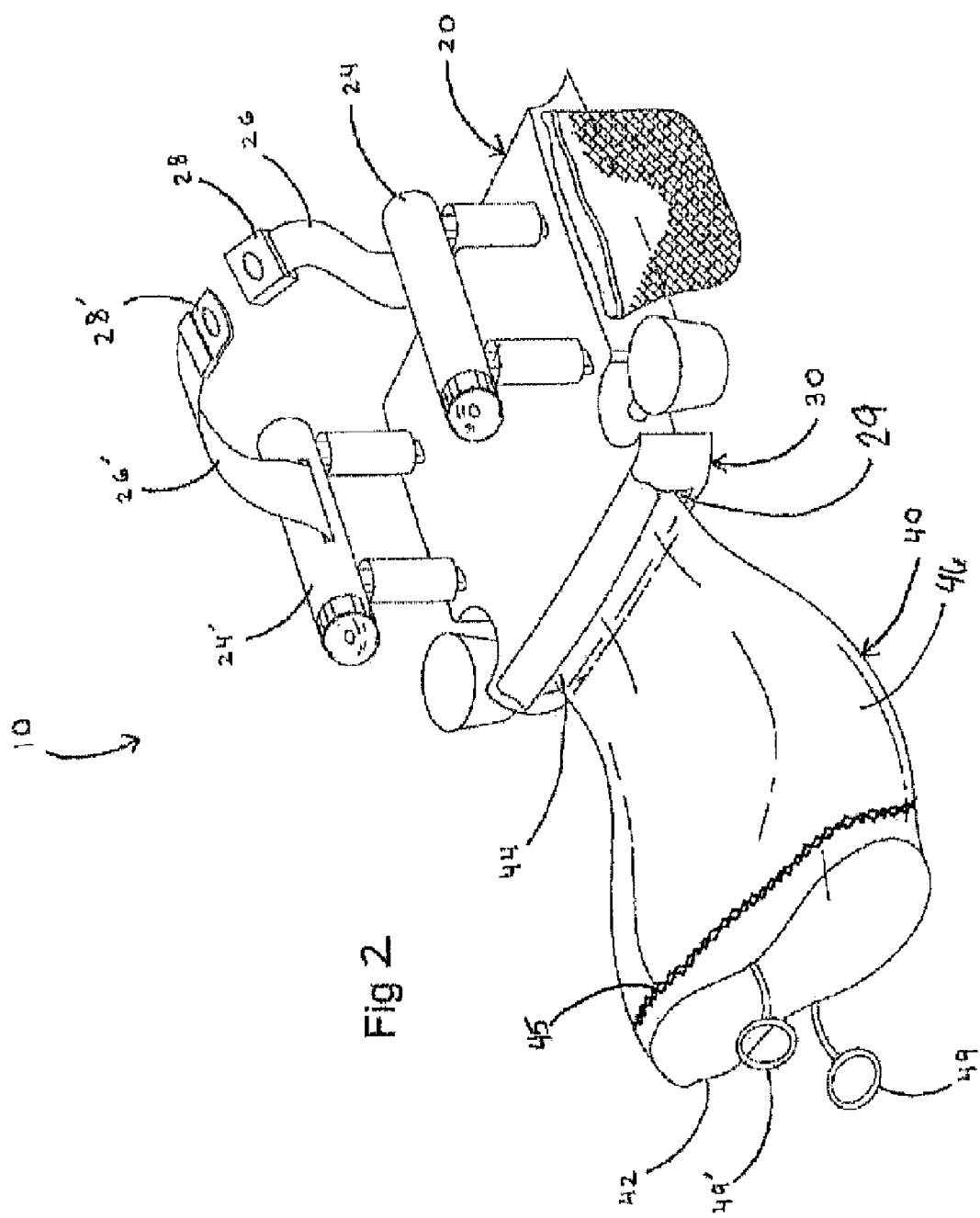
FIG. 2 represents an isometric view of a different safety seat design for an infant incorporating one of the preferred embodiments of the present invention showing the flexible enclosure being pulled out.

Referring now to the drawings, where the present invention is generally referred to with numeral 10, it can be observed that it basically includes seat assembly 20 and flexible enclosure assembly 40 releasably contained therein. Seat assembly 20 includes compartment assembly 30 for storing flexible enclosure assembly 40. One of the preferred embodiments for the present invention is shown in FIG. 1 with enclosure assembly 40 deployed.

Seat assembly 20, as seen in FIGS. 1a; 1b; and 1c, corresponds to a different seat design than FIG. 1 but also including seat member 22, armrest members 24 and 24', safety straps 26 and 26' with releasable buckle members 28 and 28' and compartment assembly 30. Additionally, this design includes back rest member 25. Other variations of seat assembly 20 are to be considered equivalent provided that they are suitable for mounting of compartment assembly 30, or integrally building it therein. In the preferred embodiments, seat assembly 20 is buoyant. Assembly 20 can be made out of plastic or other durable and rigid material so that the entire assembly is buoyant. Assembly 20 includes compartment 30 for housing rolling mechanism 60 and assembly 40. Compartment 30 is preferably located below seat member 22.

Flexible enclosure assembly 40 includes flexible bag member 46 that is made out of plastic or any other impermeable flexible material. Member 46 is preferably transparent and has open end 42. Open end 42 includes stretchable elastic member 45 that is normally constrained. Member 45 is peripherally mounted at a position adjacent to open end 42, at a predetermined distance therefrom. Upon the application of a relatively small force, open end 42 is stretched out to receive seat assembly 20 and the infant. It is preferably similar to a large plastic bag with the other end 44, rigidly mounted to spring loaded rolling or winding mechanism 60 inside of compartment assembly 30.

Figure 3:
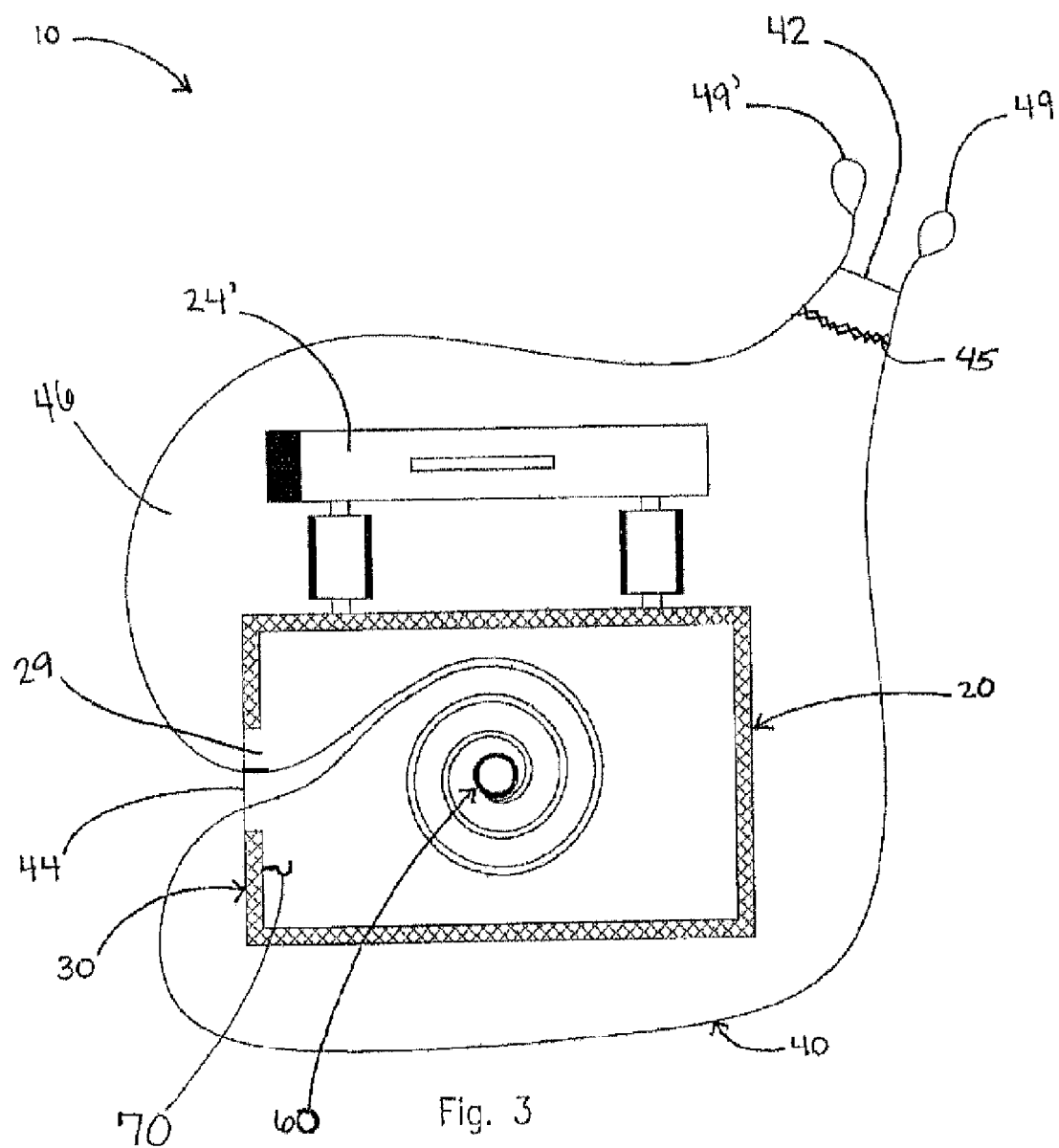
FIG. 3 represents a cross sectional side representation of the compartment of the previous figure showing rolling mechanism 60.

Hook assembly 70 is mounted interiorly adjacent to through aperture 29 in seat assembly 20 and inside compartment 30, as best seen in FIG. 3. Hook assembly 70 cooperatively receives loop 47 keeping enclosure assembly 40 tense.

Figures 4, 4A:
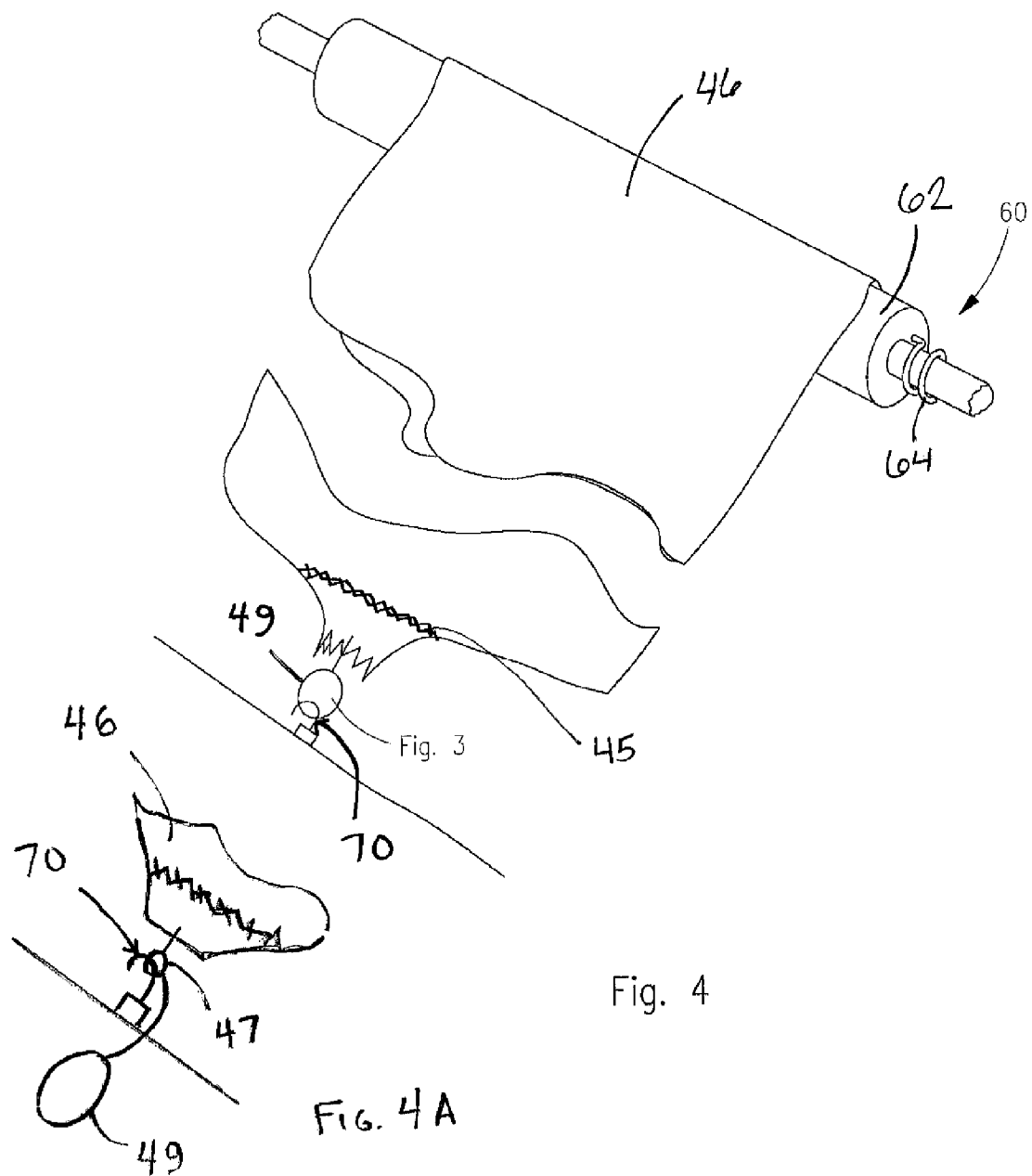
FIG. 4 is a partial representation of the winding or rolling mechanism 60 and the hook 70 where handle member 49 is anchored while on storage.
FIG. 4A is an alternate embodiment for handles 49 that includes loop 47.

As best seen in FIG. 4, loops 47; 47' is mounted to handle members 49; 49'. Handle members 49 and 49' are rigidly attached to the edge of bag assembly 46 adjacent to open end 42. Members 49 and 49' have cooperative shape and dimensions to permit a user to readily pull assembly 40 out from compartment assembly 30. In the preferred embodiment shown in FIG. 1a, handle members 49 and 49' protrude outside compartment assembly 30 for ready deployment.

In operation, a user pulls handle member 49 and 49' and elastic member 45 is stretched to permit the covering of seat assembly 20 and the infant. In most accidents involving drowning in a body of water, the passengers are surprised with the water flowing inside the vehicle. Nonetheless, there are precious seconds to save some air in enclosure 40. The present invention will improve the child's possibilities of survival without interfering with the use of the infant's safety seat.

Rolling or winding mechanism 60 is shown in FIGS. 3 and 4. Winding axle 62 is biased with spring member 64 which keeps flexible bag 46 rolled. Upon the application of a pulling force of a predetermined magnitude, bag 46 is pulled out keeping certain tension that helps a user to position open end 42 of bag 46 over the seat assembly.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A safety seat apparatus for infants comprising:
    A) a buoyant seat assembly having a seat member and safety strap means for securing an infant user on said seat member, said seat assembly further including a compartment located below said seat member and a through aperture connecting said compartment with the exterior;
    B) a flexible enclosure means for selectively and completely covering said seat assembly and user to provide the latter with a significant amount of entrapped air for temporary breathing and said enclosure means having an open end and a closed end, said open end having cooperative dimensions to receive therethrough said seat assembly and an infant user seating thereon; and
    C) a spring biased winding mechanism for winding said flexible enclosure means so that retrieval of said enclosure means requires the application of a pulling force of a predetermined magnitude.

2. The safety seat apparatus set forth in claim 1 further including:
    D) a hook assembly for holding said open end relatively close to said aperture.

3. The safety seat apparatus set forth in claim 2 wherein a stretchable constraining member is peripherally mounted adjacent to said open end.

4. The safety seat apparatus set forth in claim 3 further including:
    E) handle means for retrieving said flexible enclosure means from said compartment means, said handle means being mounted to said enclosure means and being positioned adjacent to said open end.

5. The safety seat apparatus set forth in claim 4 wherein said enclosure means is transparent.

6. The safety seat apparatus set forth in claim 5 wherein said handle means includes loop means for engaging said hook assembly and permitting said handle means to protrude outwardly, at least partially, through said through aperture.

7. The seat apparatus set forth in claim 6 wherein said seat assembly includes armrest members and a backrest.

* * * * *